US008170992B2

(12) United States Patent  (10) Patent No.: US 8,170,992 B2
Ayars  (45) Date of Patent: May 1, 2012

(54) METHOD AND SYSTEM FOR BATCH PROCESSING FORM DATA

(75) Inventor: Frank Raymond Ayars, Corona, CA (US)

(73) Assignee: International Business Machines Corporation, Armonk, NY (US)

(*) Notice: Subject to any disclaimer, the term of this patent is extended or adjusted under 35 U.S.C. 154(b) by 1127 days.

(21) Appl. No.: 12/022,036

(22) Filed: Jan. 29, 2008

(65) Prior Publication Data
US 2009/0193420 A1 Jul. 30, 2009

(51) Int. Cl.
G06F 7/00 (2006.01)
(52) U.S. Cl. ........................................ 707/643; 718/101
(58) Field of Classification Search .......... 707/803–805, 707/643
See application file for complete search history.

(56) References Cited

U.S. PATENT DOCUMENTS

| | | | | |
|---|---|---|---|---|
| 5,826,253 | A * | 10/1998 | Bredenberg | 1/1 |
| 6,006,242 | A * | 12/1999 | Poole et al. | 715/209 |
| 6,055,327 | A * | 4/2000 | Aragon | 382/138 |
| 6,240,441 | B1 | 5/2001 | Beckett et al. | 709/200 |
| 6,490,715 | B1 * | 12/2002 | Moriwaki et al. | 716/108 |
| 6,571,244 | B1 * | 5/2003 | Larson | 707/753 |
| 7,120,825 | B2 | 10/2006 | Ji et al. | |
| 7,720,797 | B2 * | 5/2010 | Polk | 707/805 |
| 2002/0065795 | A1 * | 5/2002 | Asherman | 707/1 |
| 2003/0105795 | A1 | 6/2003 | Anderson et al. | |
| 2003/0217008 | A1 | 11/2003 | Habegger et al. | |
| 2004/0049773 | A1 | 3/2004 | Yotsukura | |
| 2004/0143646 | A1 | 7/2004 | Klubertanz | |
| 2004/0215434 | A1 * | 10/2004 | Hunt et al. | 703/15 |
| 2004/0215436 | A1 * | 10/2004 | Roesner et al. | 703/15 |
| 2004/0225751 | A1 * | 11/2004 | Urali | 709/246 |
| 2005/0177824 | A1 | 8/2005 | Kipman et al. | |
| 2006/0020619 | A1 * | 1/2006 | Netz et al. | 707/102 |
| 2006/0195434 | A1 | 8/2006 | Mourra | |
| 2006/0206866 | A1 * | 9/2006 | Eldrige et al. | 717/122 |
| 2006/0288294 | A1 | 12/2006 | Bos et al. | |
| 2007/0006234 | A1 | 1/2007 | Ogata | |
| 2007/0101331 | A1 * | 5/2007 | Krebs | 718/101 |
| 2007/0250784 | A1 * | 10/2007 | Riley et al. | 715/764 |
| 2010/0042661 | A1 * | 2/2010 | Lee et al. | 707/204 |

OTHER PUBLICATIONS

Office of Financial Management, "Agency Financial Reporting System: Batch Interface", Office of Financial Management, Accounting Division, Feb. 2007, pp. 1-24.
Department of Education, "FMS Data Control", Kwazulu-Natal, Department of Education and Culture, Aug. 1, 2001, 24 pages.

* cited by examiner

*Primary Examiner* — James Trujillo
*Assistant Examiner* — Linh Black
(74) *Attorney, Agent, or Firm* — Patterson & Sheridan, LLP

(57) ABSTRACT

The input and batch processing of data for insertion in a database. In one aspect of the invention, processing input data includes receiving data for insertion into a database, the data including data fields holding data entries. At least one of the data fields is determined to be a standard field having a standard data entry, and at least one different data field is determined to have been designated a batch mode field, where each batch mode field has a plurality of associated batch mode data entries. A data record is created for each batch mode data entry of the batch mode field, where each data record includes a different batch mode data entry, and each data record includes a copy of the standard data entry.

21 Claims, 5 Drawing Sheets

METHOD AND SYSTEM FOR BATCH PROCESSING FORM DATA

FIELD OF THE INVENTION

The present invention relates to the input of data in database systems, and more particularly to batch processing for data to be inserted into a database.

BACKGROUND OF THE INVENTION

The input of data to a database often takes the form of inserting data records for storage in the database. When submitting records for batch processing of the data for insertion, each record includes metadata implemented as a number of fields that may correspond in one or more of the records and contain the same or different data relative to other records. One way to input such records is to present the user with a form for each record, such as a displayed screen in a graphical user interface (GUI) that displays the different fields of a record. The user can type in or otherwise input data of the record into the different fields.

It is often the case that a user would like to enter a number of records into a relational database, where all the records contain the same metadata with the exception of one or a few fields that have different data entries in one or more of the records. One way of inputting such records is to open a form for each record and re-enter the data into each field for every record's form. However, such inputting is labor intensive and wasteful, since much of the data is the same in each record. Thus, other methods have been used to ease the duplication of effort in such cases.

In one method, a form that has been filled with data is copied and opened as a new form for a new record with the fields already filled with the copied data, and only the fields that are different are changed to different data. The problem with this technique is that time and effort are expended in opening or displaying a form for every record that has at least one field with different data, and in changing particular fields in every such opened form. This can consume a considerable amount of time, especially when there are a large number of records to input.

In another method, batch processing of data from a file is performed. A custom formatted file is prepared that includes the data for all the records. Custom program code reads the formatted file and processes the records to insert the data into the database. The formatted file can in some cases be easier and faster to prepare with data than inputting data into fields of a form. However, this method requires custom program code to be written, as well as preparation of a formatted file in a particular customized format that the program code has been programmed to read. Such customization can add additional cost and time to the task of data input.

Accordingly, what is needed is a method and apparatus for inputting data records to a computer system for batch processing which allows significant reduction in effort when inputting records having large amounts of duplicate data and some differing data, and yet requires no custom program code or custom formatting of data in a file. The present invention addresses such a need.

SUMMARY OF THE INVENTION

The invention of the present application relates to the input and batch processing of data for insertion in a database. In one aspect of the invention, a method for processing input data includes receiving data for insertion into a database, the data including a plurality of data fields and each data field holding a data entry. At least one of the data fields is determined to be a standard field having a standard data entry and at least one different data field is determined to have been designated a batch mode field, where each batch mode field has a plurality of associated batch mode data entries. A data record is created for each batch mode data entry of the batch mode field, where each data record includes a different one of the batch mode data entries, and each data record includes a copy of the standard data entry.

In another aspect of the invention, a method for receiving and providing data for batch processing includes causing a display of a data entry form having one or more data fields, and causing a display of a batch mode selector for each of the one or more data fields, where each batch mode selector is receptive to user input to select a standard mode and a batch mode for the associated data field, and only one of the modes is active at one time. Only a single data slot is displayed for a data field in the standard mode and a plurality of data slots are displayed for a data field in the batch mode, where each data slot can receive a data entry from a user. The data entries entered in the data fields are provided for creation of data records, where each data entry in a batch mode data slot is to be included in a different created data record and each data entry in a standard mode data slot is to be copied into each created data record.

The present invention allows more efficient input of data for batch processing in a data entry form or other input mode. Batch mode fields can be used to input differing data entries and will automatically cause different records to be created with the different data entries while non-batch data is automatically duplicated, thus significantly reducing the effort required in data entry.

BRIEF DESCRIPTION OF THE FIGURES

FIGS. 2A and 2B are diagrammatic illustrations of an example data entry form interface of the present invention;

DETAILED DESCRIPTION

The present invention relates to the input of data in database systems, and more particularly to batch processing for data to be inserted into a database. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

The invention can take the form of an entirely hardware embodiment, an entirely software embodiment or an embodiment containing both hardware and software elements. A software embodiment can include but is not limited to firmware, resident software, microcode, etc. Furthermore, the invention can take the form of program instructions or code stored by a computer-readable medium for use by or in connection with a computer or any instruction execution system. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk (e.g., CD-ROM, DVD, etc.).

To more particularly describe the features of the present invention, please refer to FIGS. 1-4 in conjunction with the discussion below.

Figure 1:
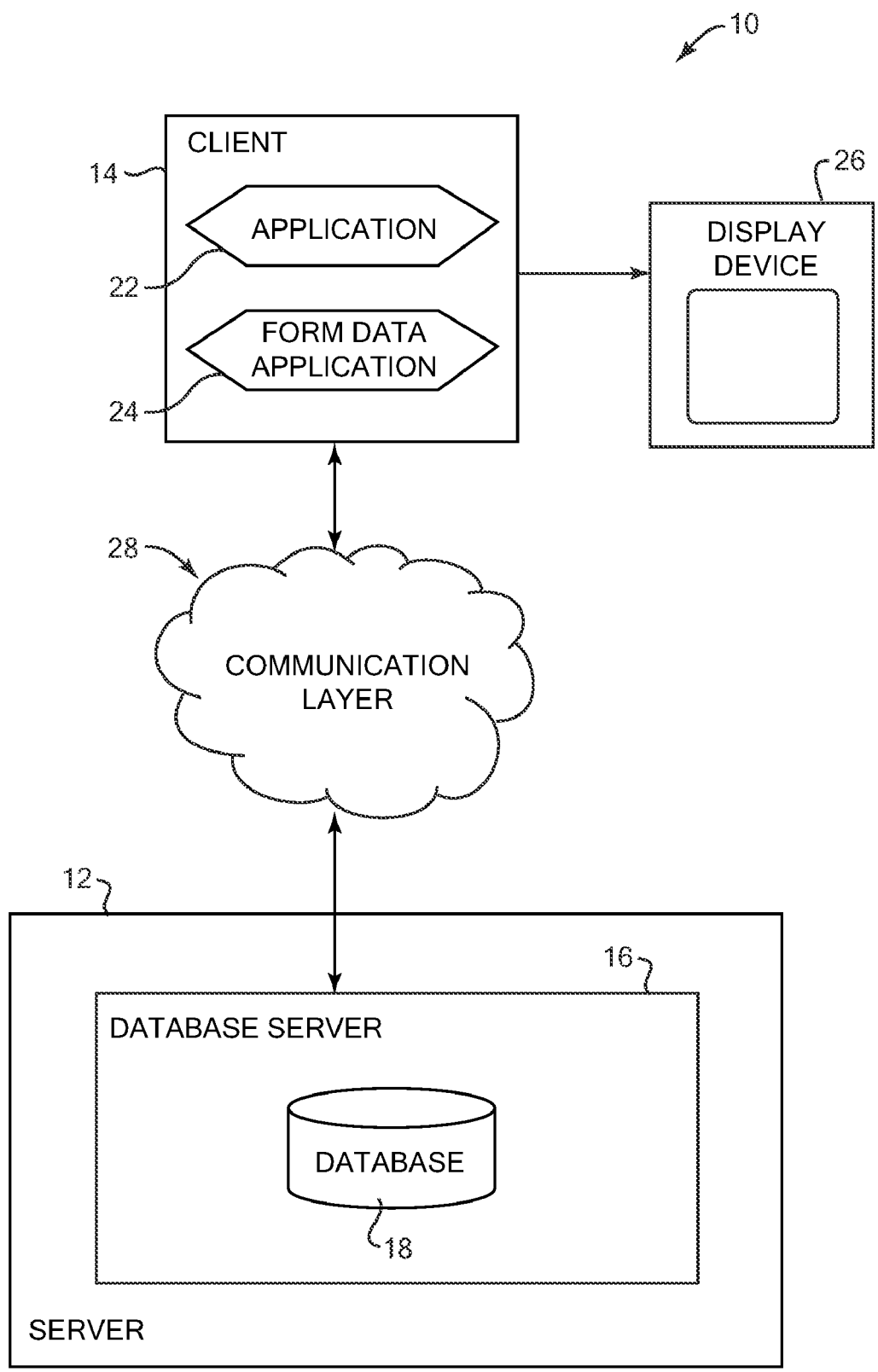
FIG. 1 is a block diagram of a system suitable for use with the present invention.

FIG. 1 is a block diagram illustrating a system 10 suitable for use with the processing of data of the present invention. System 10 includes exemplary components, such as a server 12 and a client 14.

Server 12 is implemented as one or more computer systems or electronic devices. For example, the server 12 can be a mainframe computer, desktop computer, workstation, portable computer, or electronic device. One or more microprocessors and memory devices (not shown) control the operation of the server, including data manipulation, computation, input/output, and other typical functions.

The server 12 can include one or more database servers 16, which are implemented on the server 12 and perform functions and operations specific to a database system, such as a relational database. A database server 16 can include the necessary software to, for example, send and receive appropriate database commands and data, read and write data to a database, allocate space for and organize data, etc. For example, the database server 16 can be implemented based on a known standard, such as DB2 from IBM Corporation, or other database standards. In some embodiments the database server 16 can include the necessary program instructions and/or components to implement the present invention.

One or more databases 18 are included in database server 16, where a database 18 is an entity that includes user data as well as information and functions needed to implement the data storage. The database server 16 organizes data in database 18 according to rules and structures as specified by the database creator and administrator. For example, the data can be organized into tables and table spaces and can receive data records for insertion into tables or other structures. The storage of data in the database 18 is implemented using one or more storage devices, such as hard disks, magnetic tape, optical storage devices (CD, DVD, etc.), memory, or other types of storage media. In an alternate embodiment, the database 18 can be distributed among multiple computer systems or electronic devices, such as multiple servers 12.

Client 14 can be any suitable computer system or electronic device that allows a user (e.g. a person or program) to communicate with the server 12. Client 14 can be implemented on well-known system hardware, including one or more microprocessors, memory (RAM, ROM, Flash memory, etc.), and various peripherals including storage devices (hard disk, optical storage such as DVD-ROM and CD-ROM), input devices (keyboards, pointing devices), output devices (monitors, printers) communication devices and networking devices, etc.

The client 14 can implement one or more applications 22, which can be database interface applications, for example. A database interface allows the user to input queries to the database server 16, to search for data stored in the database 18 that satisfies the queries, and/or return that data to an application 22. For example, user access can be provided to the data of the database 18 using a database language, such as Structured Query Language (SQL). In alternate embodiments, interface application 22 can be implemented on the server 12 to allow access to database server 16 for a user.

In relation to the described embodiment of the present invention, a form data application 24 is included in application 22 or is provided as a separate application, and provides data entry forms to the user so that the user can input data that will be entered into the database 18. In the described embodiment, the client 14 provides a graphical user interface (GUI) that is used to display features to the user on a display device 26. The form data application 24 uses the GUI to display a form to the user into which the user can input data. The input data can be sent to the server 12 and database server 16 in the form of records (e.g., entries or line items) to be entered into the database 18. In other embodiments, the input data can be stored as records on a local or remote storage device, and input to the database 18 (or other storage) at some later point in time.

The communication between client 14 and server 12 (or applications 22 and 24 and database server 16) is allowed over a communication layer 28, which can include transmission wires, wireless communication devices, internal circuits to the server 12, or any electronic communication medium and mechanism.

Figures 2A, 2B:
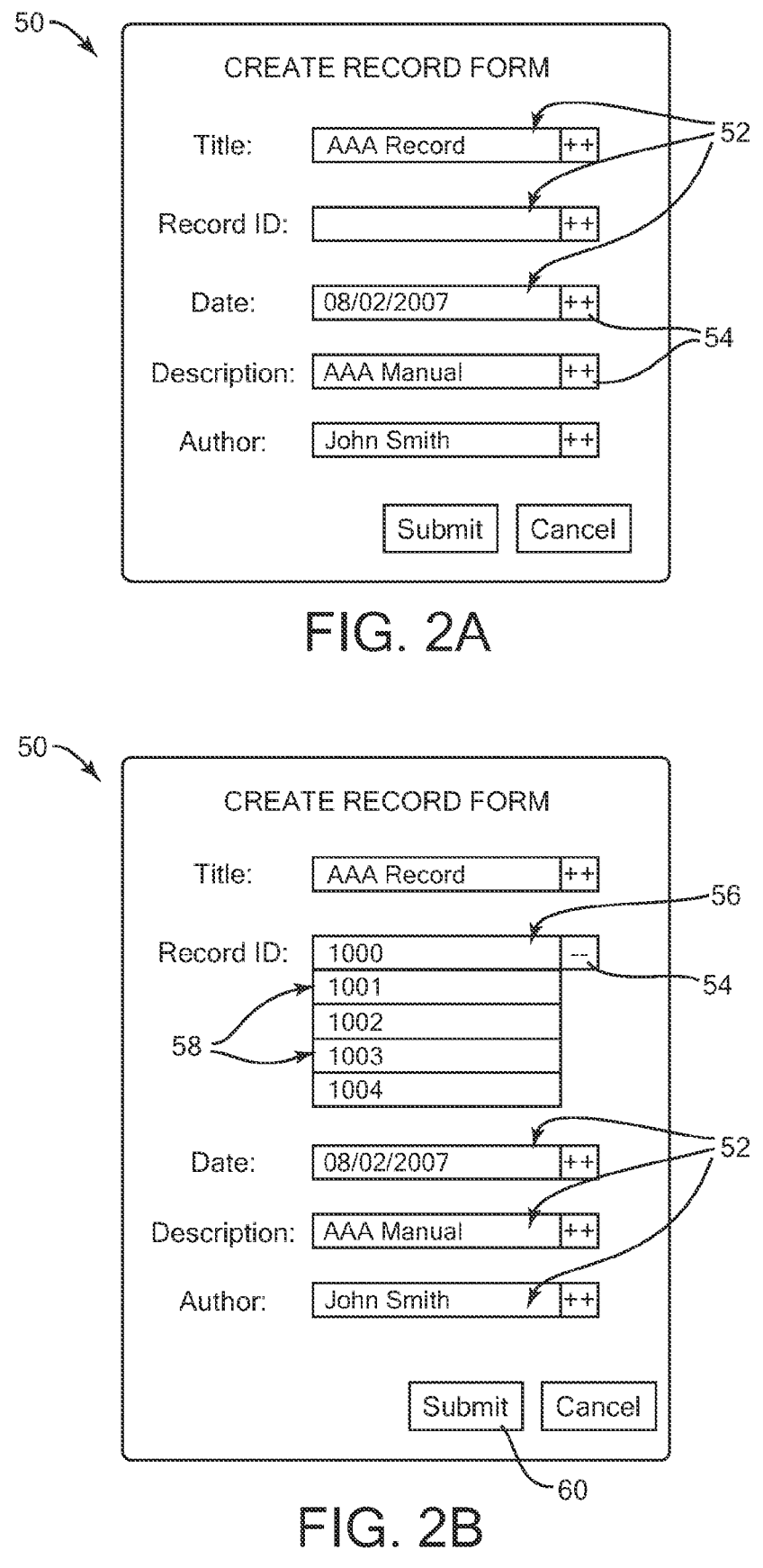

FIG. 2A is a diagrammatic illustration of an example data entry form interface 50 of the present invention for batch processing of data. Form interface 50 can be displayed in a GUI on a display device 26, for example, to allow a user to input data which will be processed and provided to the database 18 as records to be stored.

Form interface 50 includes a number of displayed data fields 52 in which the user may input data. For example, the user can move a displayed pointer onto a field using an input device such as a mouse, stylus, keyboard, etc., and then input a data entry in a data entry slot of the field using the same or other input device. Each data entry can include one or more values. In the example of FIG. 2A, the form interface includes five fields labelled title, record identification (ID), date, description, and author. The data entered in these exemplary fields includes text data.

In other embodiments there can be a different number of data fields and/or the fields can be used to input various other categories of data. Furthermore, the type of data entries entered in the fields can be different. For example, text or string values, integer values, floating point values, or even multi-valued properties (a data entry having multiple different values) can be used as a single data entry input in a field.

Each displayed field 52 includes a batch mode selector 54 of the present invention. The batch mode selector 54 is used to select whether a field 52 is in standard (non-batch) mode or batch mode. Standard mode allows the user to enter a single data entry while batch mode allows the input of multiple data entries, as described in greater detail with respect to FIGS. 2B and 3. In FIG. 2A, all the fields are shown in standard mode.

The record ID field is shown blank because the user wishes to enter multiple data entries in batch mode.

FIG. 2B is a diagrammatic illustration of the data entry form interface 50 of FIG. 2A in which batch mode has been selected for one of the data fields 52. The batch mode selector 54 of field 56 has been selected by the user to toggle the field from standard mode to batch mode. In the example shown, the selection of the batch mode is indicated by changing the "++" indicator displayed on the selector 54 indicating standard mode, to a "--" indicator that indicates batch mode. In other embodiments, other indications can be displayed.

Once batch mode has been selected for the field 56, a number of batch mode data entry slots 58 are displayed for the field 56. Each batch mode slot 58 receives a data entry input by the user and the slots are displayed in association with the field 56. In the example shown, the batch mode slots 58 are displayed as a list of fields expanded from the original field 56, appearing similarly to rows in a spreadsheet. This indicates to the user that multiple data entries will now be accepted for the field 56 instead of a single data entry as in standard mode. In other embodiments, the batch mode slots 58 can be displayed in other ways, such as in a horizontal orientation, in a separate screen, window, or dialog box, etc.

In FIG. 2B, the user has input data entries into all the batch mode slots 58. For example, the user can provide input (such as hitting a particular key or providing other input) to cause a desired number of batch mode slots to be displayed. In some embodiments, if there is a very large number of batch mode slots 58, then a portion of the slots can be displayed and a displayed scroll bar or other control can allow the user to scroll the view to any desired batch mode slots. The multiple batch mode slots 58 function to cause the creation of a different record for each slot, thus allowing a user to create multiple records for batch processing. This is described in greater detail below.

If the user is finished entering and/or changing data in the form, then the submit button 60 can be selected to provide the data in the fields 52 for batch processing and insertion into a database or other storage as described below. If the user wishes to return a field 52 from batch mode to standard mode, the batch mode selector 54 can again be selected, such that the selector 54 functions as a toggle. In other embodiments, other controls can be used to select standard mode from batch mode.

Figure 2C:
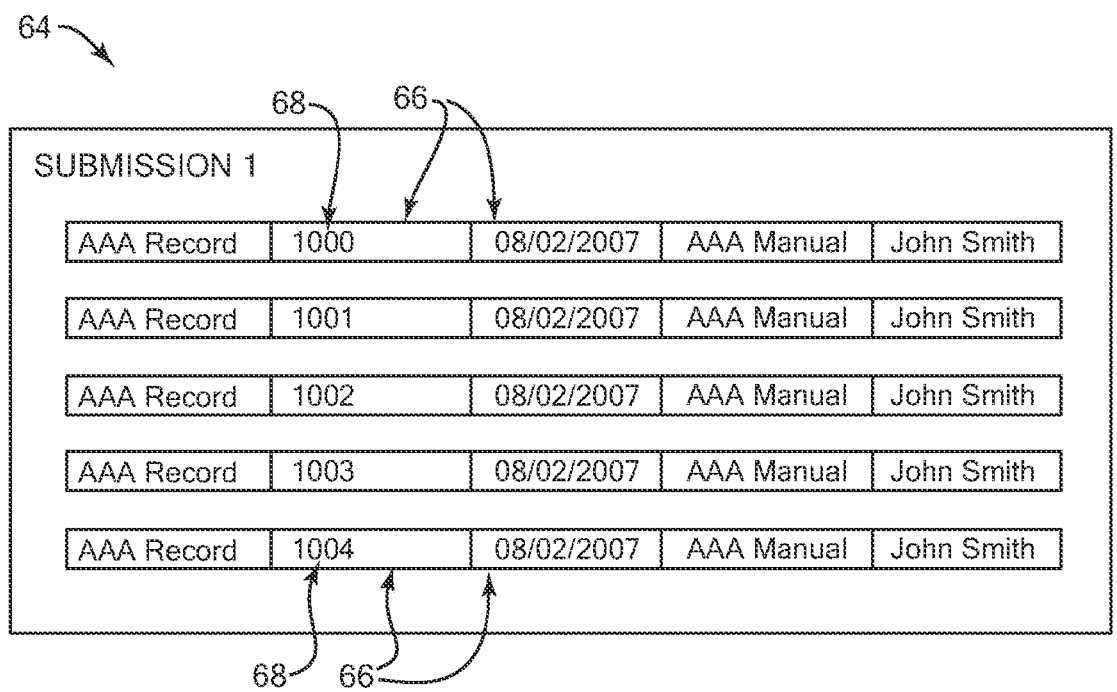
FIG. 2C is a diagrammatic illustration of a number of records that have been created based on a submission by the user of the data shown in the form interface of FIG. 2B.

FIG. 2C is a diagrammatic illustration of a number of records 64 that have been created based on a submission by the user of the data shown in the form interface 50 of FIG. 2B. Each record is shown as a horizontal group of data from the fields 52 of the interface 50. Each record includes a number of data fields 66 that correspond to the displayed data fields 52 of the data entry form of FIGS. 2A and 2B, and each data field 66 includes a data entry 68 from the corresponding displayed field. The data from the data entry form 50 can be received, and the creation of the records 64 can be performed, by the form application 24, an application 22 on the client 14, or by a different application on the server 12 or database server 16, depending on the particular embodiment. The records 64 can be saved in the database as database records, entries in a database table, or in some other format.

As shown, each data entry input into a batch mode slot 58 has caused a different record to be created corresponding to that data entry for insertion in the database, with the record holding the data entry from the corresponding field 56. Thus, from the five filled batch mode slots 58 shown in FIG. 2B, five different records 64 are created, each record having a different data entry 66 from one of the batch mode slots 58 of field 56. Any fields 52 in standard mode in interface 50 causes the data entry in those fields to be copied into every record created, such that the standard values in a record 64 are identical to all the other records.

In this way, a user need only input a minimum of information with a minimum of interface manipulation to achieve insertion of multiple records for batch processing, each record having duplicate data entries as well as differing entries where desired. This process is described in greater detail with respect to FIGS. 3 and 4.

Figure 3:
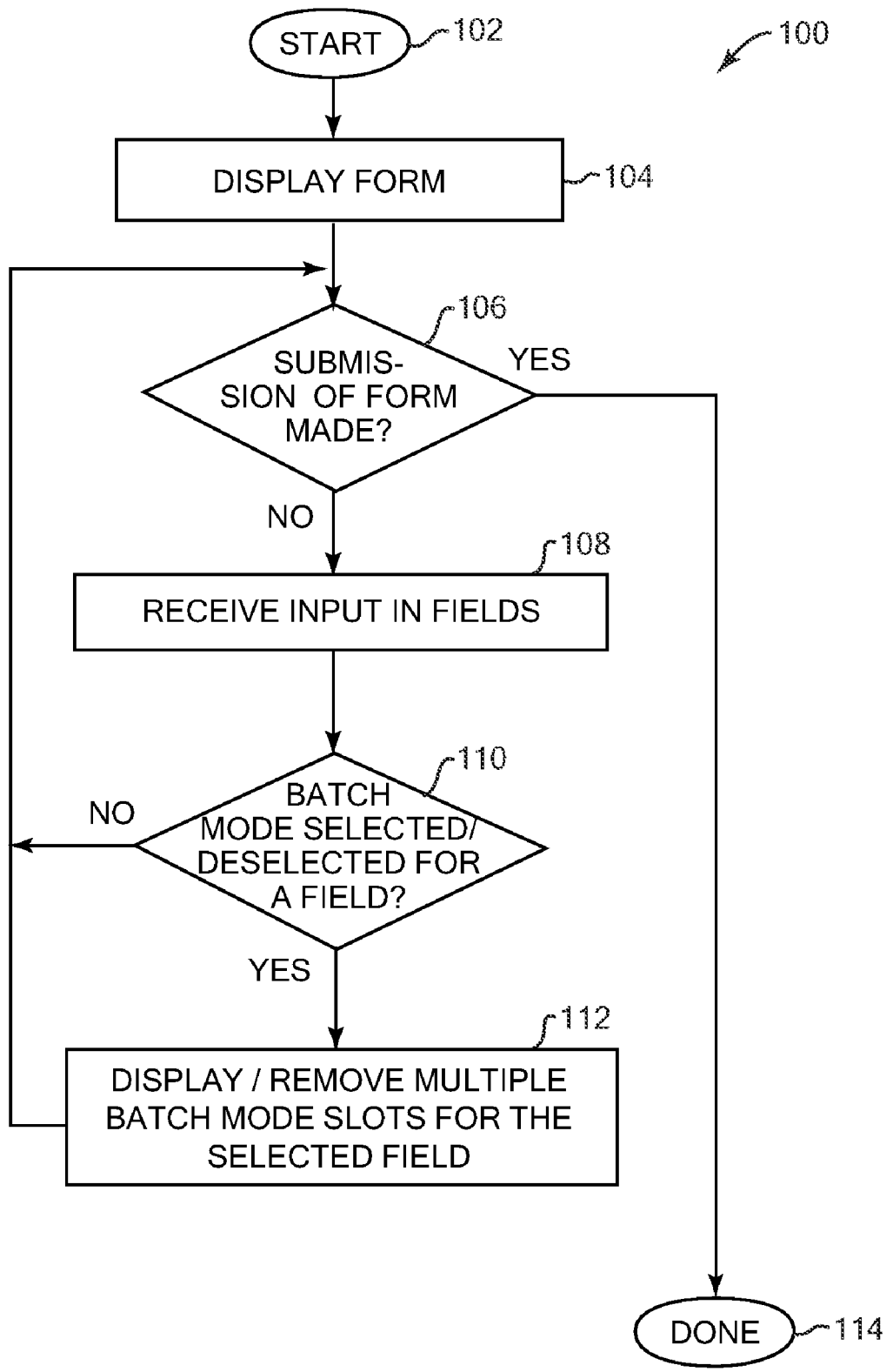
FIG. 3 is a flow diagram illustrating a method of the present invention for receiving input data using a displayed data entry form.

FIG. 3 is a flow diagram illustrating a method 100 of the present invention for receiving input data using a displayed data entry form. The methods described herein can be implemented in hardware, software, or a combination of both hardware and software. The methods can be implemented using program instructions provided on a computer readable medium, such as memory, magnetic tape, a magnetic disk, optical disk, etc. It should be noted that the "user" inputting data and making selections can be a person interfacing with a GUI. Alternatively, the user can be a program providing input and selections equivalent to those from a person.

The method 100 begins at 102, and in step 104, a data entry form is displayed into which the user can input data. In one example embodiment, the form interface 50 shown in FIGS. 2A and 2B can be displayed on a display device 26 of the client 24. In step 106, the process checks whether a submission of the form has been made by the user. The user submits the form when he or she is finished entering data and wishes the data to be processed and inserted into the database or otherwise stored. For example, the user may have selected the submit button 60 as shown in FIG. 2B to indicate the submission of the form, and this selection is detected by the method 100.

If submission of the form is detected, then the process is complete at 114. The processing of the submitted data follows and is described with reference to FIG. 4. If submission of the form is not detected, then in step 108 input from the user is received in the input slots of the fields 52 of the form. In some embodiments, the form can be initially displayed such that all fields 52 are in standard mode, and the first input is in standard fields; in later iterations of the method 100, the input can be in batch mode fields as well as standard fields.

In step 110, the process checks whether batch mode has been selected or deselected by the user. Batch mode is selected to change a field from standard mode in which the data entry in the field appears in every record created from the form, to batch mode which drives the creation of multiple records and multiple data entries are input to provide different data in the different records. Batch mode is deselected to change a field from batch mode to standard mode. In the example of FIGS. 2A and 2B, batch mode for a field is selected or deselected by selecting the batch mode selector 54 displayed next to the field, where each selection toggles the mode from one mode to the other.

If a selection or deselection for batch mode has not been detected for any fields, then the process returns to step 106 to check for submission of data and receive more input in fields. If batch mode selection or deselection has been detected, then in step 112 multiple batch mode slots are displayed or removed for the corresponding selected field 52, where the slots are displayed for batch mode selection and removed for batch mode deselection. For example, as shown in FIGS. 2A and 2B, a list of multiple data entry slots can be displayed for the selected field 52 in batch mode. The process then returns to step 106 to check for submission of data and receive more input in fields of the form.

Thus the user can select any or all of the fields 52 in the form to be in batch mode or in standard mode. If multiple batch mode fields are selected, then the first slot position in one batch mode field corresponds to the first slot position in every other batch mode field, the second slot position corresponds to the second slot position in every other batch mode field, and so on. This causes the data in the corresponding first slot of every batch mode field to be stored in a first record, the data in the second slot of every batch mode field to be stored in a second record, and so on.

The display of multiple batch mode slots or fields for the input of different data entries allows the user to cause the creation of a different record for each different data entry made in the batch mode field. The user can easily create a desired number of records with a different value in the corresponding field of each record as specified in the multiple slots.

In some embodiments, an optional feature can be provided in which multiple batch mode slots are displayed all at one time to a user. For example, if a user selects batch mode for a first field, and then selects batch mode for a second field, the batch mode slots for each field can both be displayed on the screen so that the user can easily view corresponding slots in different fields. In some embodiments, the slots of corresponding positions of each batch mode field can be displayed together in a table similar to a spreadsheet, e.g., each corresponding slot displayed in a row, with each row representing a different slot position. Such an embodiment can allow the user to enter data in corresponding batch mode slots of multiple fields at the same time, so that the user does not have to individually select each different batch mode field in the displayed form to input data.

Figure 4:
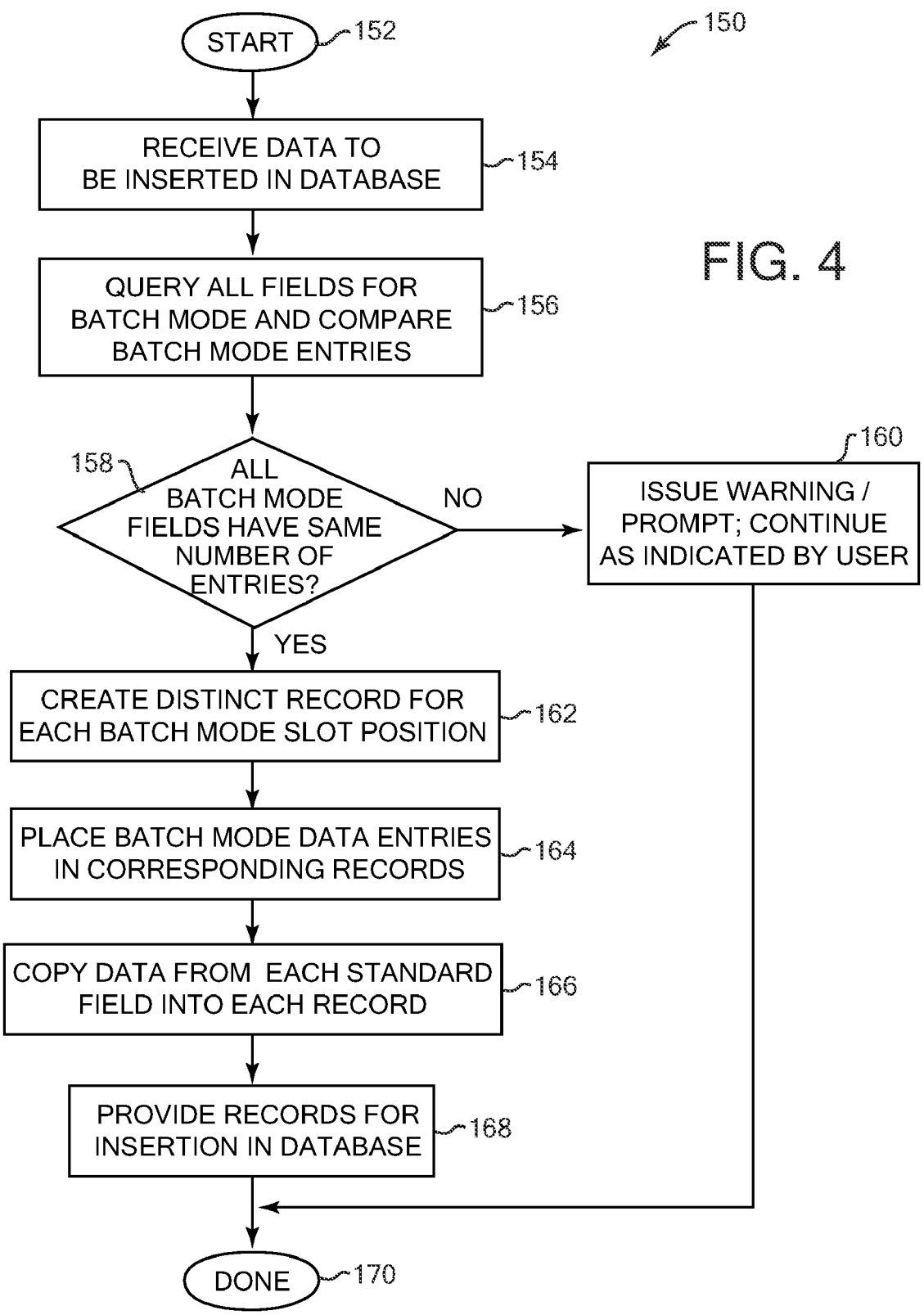
FIG. 4 is a flow diagram illustrating a method of the present invention for processing data for insertion in a database.

FIG. 4 is a flow diagram illustrating a method 150 of the present invention for batch processing data for insertion in a database. The method begins at 152, and in step 154 the process receives the data to be inserted in the database 18 or other storage. The data is provided as data entries in data fields. In a described embodiment, the data is received from a data entry form in which the user has input data in fields and that the user has submitted, as described above with respect to FIG. 3.

In other embodiments, the data may be received from other sources. For example, some embodiments of the invention allow a user to input the data in a formatted file or similar storage unit rather than in the displayed form of FIGS. 2A-B and 3. Data entries can be stored in the file as standard data entries or fields, corresponding to data entries entered in standard fields as explained above, or stored in the file as batch mode data entries or fields, corresponding to data entries entered in a batch mode fields. In some embodiments, one or more batch mode indicators (e.g., particular values or flags) can be stored in the file that refer to data which is intended as batch mode data entries. In other embodiments, a particular format of the data entry itself, or some other characteristic of the data, can be a batch mode indicator. For example, in one implementation, data entries having a particular class (such as a class in Java or C-sharp programming languages) can be considered batch mode data entries. A formatted file embodiment of the invention allows standard and batch mode data entries to be provided with minimal effort, since the standard data entries do not have to be copied in the file multiple times for each record.

In next step 156, the process queries all data entries in data fields of the received data for batch mode. For example, the process can check for an explicit batch mode indicator associated with each data entry, which indicates whether a data entry is a standard data entry or a batch mode data entry. In some embodiments, the process can check for an inherent property of the field itself to determine batch mode or standard mode rather than an explicit indicator. For example, if there are multiple slots or fields of data stored instead of a single field, then batch mode can be assumed.

Furthermore, the process compares the batch mode data entries for each of the batch mode fields found in the received data. In the described embodiment, a count of the batch mode data entries in each batch mode field is performed.

In step 158, the process checks whether all the batch mode fields have the same number of data entries in their batch mode slots. If not, then there is a mismatch in the number of data entries between at least two of the batch mode fields. Since each slot position corresponds in each batch mode field, a mismatch does not allow the data to be reliably assigned to records, since it is unknown which data entries correspond. Thus if there is not the same count of data entries, the process continues to step 160 to issue a warning to the user, and/or a prompt to the user asking for additional guidance. The data in question can also be displayed to the user for reference. The process can then continue as indicated by the user, e.g., the user can edit data (e.g., make the number of data entries equal in each field) and restart the process, can cancel the process, etc. If the user chooses to continue, the process can continue at step 162. In other embodiments, the process can automatically (or after user confirmation) remove data entries in slots until all the batch mode fields have the same amount of data entries. The data entries to remove can be the last data entries in the fields having the most entries, or other default or preferred slot positions.

If all batch mode fields have the same count of data entries in step 158, then the process continues to step 162, in which a distinct record is created for each filled batch mode slot position in the received data. For example, if there are three batch mode fields in the data, each batch mode field having four data entries in its slots, then a total of four records are created. The records can assume any desired format that fits the database or other storage in which they will be inserted. Thus it is the number of batch mode data entries in each batch mode field that drives the number of records that are created.

In step 164, the batch mode data entries are placed in their corresponding fields in their assigned records. The data entry in each corresponding batch mode slot of multiple batch mode fields is placed into a different field of the same record, as described above. In step 166, the data in each standard field in the received data is copied into a corresponding field in each record created in step 162. Thus the method automatically copies non-batch data into every created record, saving the user from having to manually enter or copy the data.

In step 168, the created records are provided for insertion in the database or other storage. The records can be inserted as records, entries, or line items in a database, for example. In one embodiment, the method 150 can be performed by the client 14 and the created records can be sent to the database server 16 as shown in FIG. 1. In some other embodiments, the method 150 can be performed by the server 12 or database server 16 that has received the form data from the client 14, and the server 12 or 16 provides the created records to the database 18. The method is then complete at 170.

It should be noted that the process steps of methods 100 and 150 are only one example embodiment, and these steps can be provided in a different order, in parallel (where appropriate), or in different combinations in other embodiments. For example, after the submission of the form is detected in step 114 of method 100, the following steps can be performed at a later time and/or by a different program or system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for processing input data, the method comprising:
   receiving data for insertion into a database, the data including a plurality of data fields, each data field holding a data entry;
   determining that at least one of the data fields is a standard field having a standard data entry and that at least one different data field has been designated a batch mode field, wherein each batch mode field has a plurality of associated batch mode data entries; and
   creating, by operation of one or more computer processors, a data record for each batch mode data entry of the batch mode field, wherein each data record includes a different one of the batch mode data entries, and wherein each data record includes a copy of the data entry from the standard field.

2. The method of claim 1 wherein the data is received at least in part from a displayed data field in a displayed data entry form, the displayed data field corresponding to one of the data fields in the data, and wherein the displayed data field receives at least a portion of the data to be inserted in the database.

3. The method of claim 2 further comprising providing a batch mode selector associated with the displayed data field, wherein the batch mode selector controls whether the associated displayed data field is a batch mode field.

4. The method of claim 3 wherein the batch mode selector includes a toggle control displayed with an associated data field, and wherein when the toggle control is selected by a user, the associated data field toggles between a standard mode providing a standard field and a batch field mode providing a batch mode field.

5. The method of claim 4 wherein the batch mode selector is selected using an input device to toggle the associated data field between the standard mode and the batch field mode.

6. The method of claim 1 wherein the data includes a plurality of batch mode fields, and wherein corresponding batch mode data entries of each batch mode field are provided in a single record.

7. The method of claim 6 further comprising confirming that all the batch mode fields include a same number of data entries.

8. The method of claim 7 further comprising, upon determining that all the batch mode fields do not include the same number of data entries, halting the creation of the records and issuing a warning or prompt to a user.

9. The method of claim 1 wherein the data received for insertion is provided from a formatted file having the data organized into the data fields.

10. The method of claim 9 wherein the formatted file includes at least one batch mode indicator to indicate which of the data fields are batch mode fields.

11. The method of claim 1 wherein each data field can hold a data entry of a particular type from a group comprising a text string, an integer, a floating point value, and a multi-valued property.

12. A method for receiving and providing data for batch processing, the method comprising:
   causing a display of a data entry form having one or more data fields;
   causing a display of a batch mode selector for each of the one or more data fields, wherein each batch mode selector is receptive to user input to select a standard mode and a batch mode for the associated data field, wherein only one of the modes is active at one time;
   causing a display of only a single data slot for a data field in the standard mode and a plurality of data slots for a data field in the batch mode, wherein each data slot can receive a data entry from a user; and
   creating, by operation of one or more computer processors, data records for the data entries entered in the data fields wherein each data entry in a batch mode data slot is included in a different created data record and each data entry in a standard mode data slot is copied into each created data record.

13. The method of claim 12 wherein a data record is created for each data entry slot position in one or more batch mode data fields of the displayed form.

14. The method of claim 12 wherein the batch mode is displayed for a data field by displaying a vertical list of data entry slots in association with the data field.

15. The method of claim 12 wherein the batch mode selector includes a batch mode indicator that indicates whether the associated data field is in the standard mode or the batch mode.

16. The method of claim 12 wherein the data records are created in response to the user selecting a displayed submit control.

17. A computer readable storage medium storing program instructions which, when executed performs an operation, comprising:
   receiving data for insertion into a database, the data including a plurality of data fields, each data field holding a data entry;
   determining that at least one of the data fields is a standard field having a standard data entry and that at least one different data field has been designated a batch mode field, wherein each batch mode field has a plurality of associated batch mode data entries; and
   creating, by operation of the one or more computer processors, a data record for each batch mode data entry of the batch mode field, wherein each data record includes a different one of the batch mode data entries, and wherein each data record includes a copy of the data entry from the standard field.

18. The computer readable medium of claim 17 wherein the data is received at least in part from a displayed data field in a displayed data entry form, the displayed data field corresponding to one of the data fields in the data, and wherein the displayed data field receives at least a portion of the data to be inserted in the database.

19. The computer readable medium of claim 18 further comprising providing a batch mode selector associated with the displayed data field, wherein the batch mode selector controls whether the associated displayed data field is a batch mode field.

20. The computer readable medium of claim 17 wherein the data includes a plurality of batch mode fields, and wherein corresponding batch mode data entries of each batch mode field are provided in a single record.

21. The computer readable medium of claim 20 further comprising confirming that all the batch mode fields include a same number of data entries.

* * * * *